US006959006B1

(12) United States Patent
Sarnikowski et al.

(10) Patent No.: US 6,959,006 B1
(45) Date of Patent: Oct. 25, 2005

(54) SERVICE DELIVERY UNIT FOR AN ENTERPRISE NETWORK

(75) Inventors: Scott Sarnikowski, San Jose, CA (US); Anirudha Chinmulgund, San Jose, CA (US); Sanjay Ravindra, San Jose, CA (US); Manoj Kulkarni, Cupertino, CA (US); Anil Lakhwara, San Francisco, CA (US); John Litster, Beaverton, OR (US); Harikrishin W. Hirani, Los Altos, CA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/513,937

(22) Filed: Feb. 28, 2000

Related U.S. Application Data (63) Continuation of application No. 09/342,682, filed on Jun. 29, 1999, now abandoned.

(51) Int. Cl.[7] .............................................. H04J 3/16
(52) U.S. Cl. ........................................ 370/468; 713/1
(58) Field of Search ............................... 370/541, 498, 370/503, 537, 538, 252, 353, 464, 474, 468, 370/409, 231, 389–396, 401, 230–229; 379/9.04, 379/14.01, 15.01, 32.01, 219, 202.01, 220.01, 379/229–230; 709/250, 218, 244, 100, 223–228, 709/238, 249; 713/1, 224–223, 203

(56) References Cited

U.S. PATENT DOCUMENTS

| 5,313,454 A | 5/1994 | Bustini et al. |
| 5,347,511 A | 9/1994 | Gun |
| 5,495,484 A | 2/1996 | Self et al. |
| 5,521,907 A | 5/1996 | Ennis, Jr. et al. |
| 5,561,663 A | 10/1996 | Klausmeier |
| 5,594,426 A | 1/1997 | Ushijima et al. |
| 5,603,029 A | 2/1997 | Amen et al. |
| 5,606,668 A | 2/1997 | Shwed |
| 5,694,548 A | 12/1997 | Baugher et al. |
| 5,701,465 A | 12/1997 | Baugher et al. |

(Continued)

FOREIGN PATENT DOCUMENTS

WO    WO 97/00471    1/1997

(Continued)

OTHER PUBLICATIONS

Allot Communications, "Allot Introduces Turnkey Next Generation IP Service and Creation Solution—The Virtual Bandwidth Manager: A Last Mile QoS Solution—No Customer Premise Equipment Required", pp. 1-3, Jun. 5, 2000.

(Continued)

*Primary Examiner*—Chi Pham
*Assistant Examiner*—Prenell Jones
(74) *Attorney, Agent, or Firm*—Fogg and Associates, LLC; David N. Fogg

(57) ABSTRACT

A service delivery unit for an enterprise network is provided. The service delivery unit includes at least one network interface port that is coupleable to a wide area network and at least one data port that is coupleable to a plurality of local area networks. The service delivery unit also includes a policy server interface that is coupleable to a policy server. The policy service includes policies for bandwidth allocation stored on a computer readable medium. The service delivery unit further includes a central processing unit that is communicatively coupled to the network interface port, the data port and the policy server interface. The central processing unit executes instructions to selectively allocate bandwidth in the wide area network for users of the plurality of local area networks based on the policies stored in the policy server.

21 Claims, 4 Drawing Sheets

U.S. PATENT DOCUMENTS

| | | | |
|---|---|---|---|
| 5,717,747 A * | 2/1998 | Boyle, III et al. | 379/201 |
| 5,758,083 A | 5/1998 | Singh et al. | |
| 5,764,645 A | 6/1998 | Bernet et al. | |
| 5,764,750 A * | 6/1998 | Chau et al. | 379/229 |
| 5,802,106 A | 9/1998 | Packer | |
| 5,818,842 A | 10/1998 | Burwell et al. | |
| 5,825,775 A | 10/1998 | Chin et al. | |
| 5,835,726 A | 11/1998 | Shwed et al. | |
| 5,867,483 A | 2/1999 | Ennis, Jr. et al. | |
| 5,978,356 A | 11/1999 | Elwalid et al. | |
| 6,018,516 A | 1/2000 | Packer | |
| 6,028,842 A | 2/2000 | Chapman et al. | |
| 6,038,214 A | 3/2000 | Shionozaki | |
| 6,038,216 A | 3/2000 | Packer | |
| 6,046,980 A | 4/2000 | Packer | |
| 6,047,322 A | 4/2000 | Vaid et al. | |
| 6,067,580 A | 5/2000 | Aman et al. | |
| 6,069,872 A | 5/2000 | Bonomi et al. | |
| 6,078,953 A | 6/2000 | Vaid et al. | |
| 6,081,513 A | 6/2000 | Roy | |
| 6,084,855 A | 7/2000 | Soirinsuo et al. | |
| 6,085,241 A | 7/2000 | Otis | |
| 6,115,357 A | 9/2000 | Packer et al. | |
| 6,118,662 A | 9/2000 | Hutchison et al. | |
| 6,131,120 A * | 10/2000 | Reid | 709/225 |
| 6,285,658 B1 | 9/2001 | Packer | |
| 6,446,200 B1 * | 9/2002 | Ball et al. | 713/1 |
| 6,463,470 B1 * | 10/2002 | Mohaban et al. | 709/223 |
| 6,483,912 B1 * | 11/2002 | Kalmanek, Jr. et al. | 379/219 |
| 6,487,170 B1 * | 11/2002 | Chen et al. | 370/231 |
| 6,502,131 B1 * | 12/2002 | Valid et al. | 709/224 |
| 6,556,659 B1 * | 4/2003 | Bowman-Amuah | 370/252 |

FOREIGN PATENT DOCUMENTS

| | | |
|---|---|---|
| WO | WO 99/01965 | 1/1999 |
| WO | WO 99/27684 | 6/1999 |
| WO | WO 99/30450 | 6/1999 |
| WO | WO 99/46902 | 9/1999 |

OTHER PUBLICATIONS

Allot Communications, "NetEnforcer™", 4 pgs., Jun. 2000.

Allot Communications, "NetAccountant™ Policy-based Usage Accounting ", 2 pgs., Mar. 2000.

Allot Communications, "NetEnforcer—Data Sheet, Bandwidth Management Solutions", pp. 1-7, Jun. 18, 2000.

Allot Communications, "Virtual Bandwidth Management: Improve Service Level Agreement Management with Self-provisioning of QoS", pp. 1-3, Jun. 12, 2000.

Bless et al., "Evaluation of Differentiated Services using an Implementation under Linux", pp. 97-109, 1999 IEEE.

Craig, Wilson et al., "Packeteer's Second—Generation IP Bandwidth Manager ties Quality of Service to User's Connection Speed", http://packeteer.com/news/pr.cfm?prID=101, 3 pgs., Jun. 16, 1997.

Craig, Wilson et al, "Packetshaper 1000 Extends Bandwidth Management over Frame Relay WANs to Remote Sites", http://www.packeteer.com/news/pr.cfm?prID=94, 3 pgs., Oct. 27, 1997.

Wijnen et al. "View-based Access Control Model (VACM) for the Simple Network Management Protocol (SNMP)", pp. 1-34, The Internet Society 1998.

Packeteer, Inc., "Controlling TCP/IP Bandwidth", TCP/IP Bandwidth Management Series, No. 1 of 3, The Packeteer Technical Forum, pp. 3-14, updated Nov. 1998.

Packeteer, Inc., "Shaping Traffic Behavior", TCP/IP Bandwidth Management Series, No. 2 of 3, The Packeteer Technical Forum, pp. 15-22, updated Nov. 1998.

Packeteer, Inc., "Managing UDP Traffic", TCP/IP Bandwidth Management Series, No. 3 of 3, The Packeteer Technical Forum, pp. 23-26, updated Nov. 1998.

Hilden, "Understanding Frame Relay Network Performance", pp. 1-9, ADC Kentrox, Dec. 1998.

Packeteer Intelligent bandwidth management—News Release, "New Wantop Box from ADC Kentrox Integrates Packeteer Bandwidth-Management Technology", pp. 1-3, Jun. 29, 1998.

Packeteer Intelligent bandwidth management—Online Product Demo, "Playing Favorites—Packetshaper Features", pp. 1-9, Downloaded from the Web, Feb. 27, 1999.

Taylor, "Enhanced Frame Relay DSU/CSUs: The Business Case", ADC Kentrox, Dec. 1998.

* cited by examiner

SERVICE DELIVERY UNIT FOR AN ENTERPRISE NETWORK

This application is a continuation of U.S. Ser. No. 09/342,682 filed Jun. 29, 1999, now abandoned.

TECHNICAL FIELD OF THE INVENTION

The present invention relates generally to the field of telecommunications and, in particular, to a service delivery unit for enterprise network.

BACKGROUND

In recent years, computers have become a commonplace part of life for large segments of society. Many businesses and institutions rely on vast internal networks to share data among geographically dispersed users within their organization. These networks are referred to as "enterprise networks." Generally, an enterprise network is a geographically dispersed network under the jurisdiction of a single organization. It often includes several different types of local area networks (LANs) and computer systems from different vendors.

Typically, geographically dispersed users on an enterprise LANs communicate with each other over wide area network (WAN) connections provided by one or more WAN service providers. Most common method of connection to WAN is using digital telecommunication trunks; such as T1, T3, OC-1 etc for North America and equivalent trunks for other countries.

Conventionally, a point of demarcation is provided at the connection between the enterprise network and the WAN to ensure safety and a clear separation of support responsibility by monitoring the health of the physical connection. In early systems, a channel service unit (CSU) provided the demarcation between voice centric enterprise and the WANs. In later systems, digital service units (DSUs) were developed to provide the point of demarcation between data centric enterprise networks and the WANs. A typical DSU includes a WAN port, a high-speed data port, such as V.35, for communicating with enterprise LAN equipment and additional ports for supporting enterprise voice requirements.

As Frame Relay service started to proliferate, monitoring capabilities in the DSU were enhanced to support Service Level Agreements (SLAs) between the enterprise consumer and the service providers. With the IP protocol taking over most of the enterprise networks, DSUs are starting to support monitoring of higher layers, such as protocols and applications.

WAN expenditure has always been a major component of an enterprise budget. IT managers are very sensitive of this issue and keep a tight control on the WAN bandwidth usage. Typically, an enterprise network acquires WAN bandwidth by contract with a service provider. For example, the enterprise network obtains a number of permanent virtual connections (PVCs) with appropriate service commitments (also called Service Level Agreements or SLA characteristics) which are necessary to meet enterprise needs.

With the recent information explosion, including the popularity of the Internet, the typical enterprise network carries data for both business and personal purposes. Most networks carry this mix of data indiscriminately. Unfortunately, mission critical applications for the enterprise may be compromised because less critical applications, e.g., personal web surfing, leave only a small portion of the contracted bandwidth unused at the time of a critical request.

For the reasons stated above, and for other reasons stated below which will become apparent to those skilled in the art upon reading and understanding the present specification, there is a need in the art for a method and system for allocating bandwidth of a wide area network appropriately for use by an enterprise network.

SUMMARY

The above-mentioned problems with WAN bandwidth utilization by enterprise networks and other problems are addressed by the present invention and will be understood by reading and studying the following specification. Embodiments of the present invention provide a flexible modular service delivery architecture that provides the traditional DSU demarcation functionality along with capabilities to classify, monitor and manage bandwidth usage on per user and/or application basis to meet enterprise needs. This is achieved through application level queuing and flow control, mapping of traffic to appropriate service delivery media and methods based on delivery characteristics (such as committed information rate (CIR), delay and latency), and packet/traffic labeling for getting service priority within service provider network. Embodiments of the present invention also support bandwidth management based on business policies; such as Web Browsing should not exceed 64 KBPS and should be done over low CIR connection to the WAN. In one embodiment, a policy server is provided to allow an enterprise's system administrator to define global multi-site bandwidth usage policies using user-friendly Graphical User Interface (GUI) and those policies are pulled by individual service delivery units on per need basis. The policies stored on the server are used to determine, for example, the amount and type of bandwidth to allocate to a user, a group of users or an application.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

I. Enterprise Network

Figure 1:
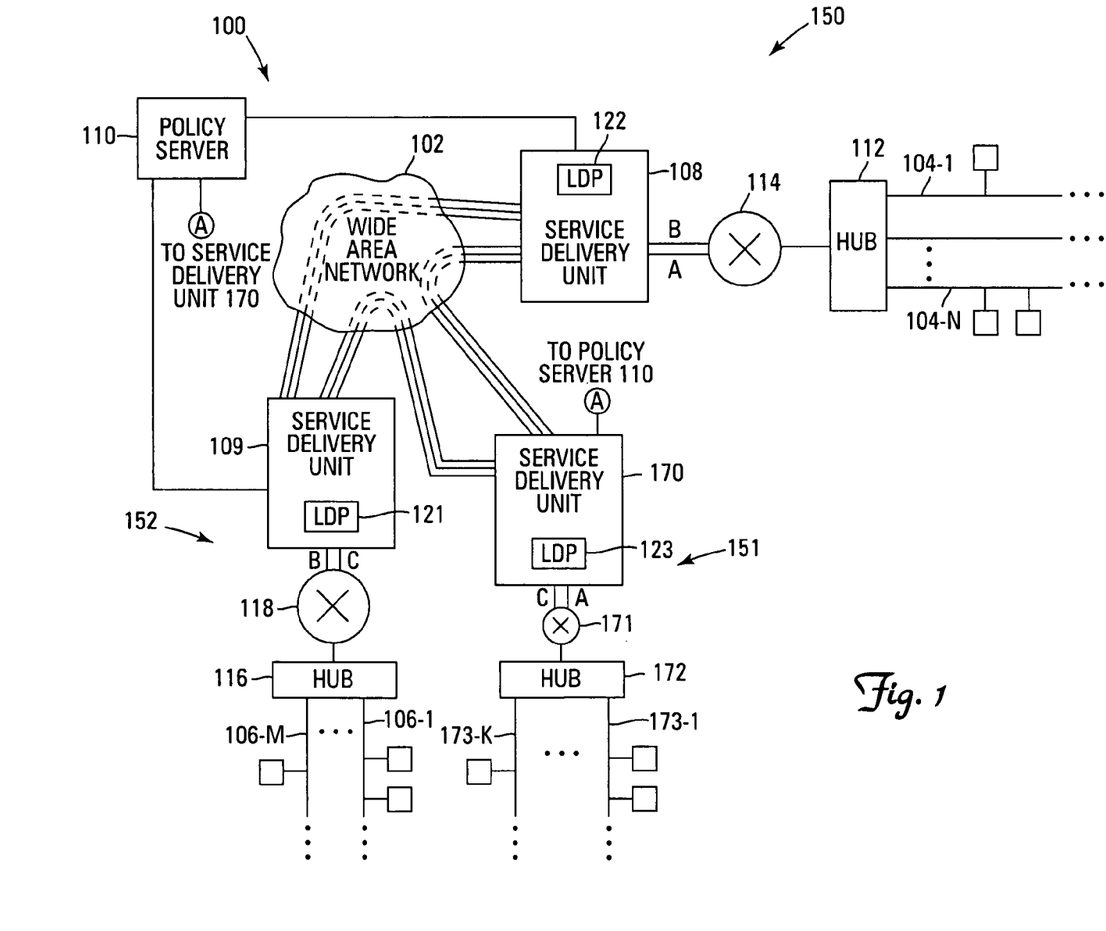
FIG. 1 is a block diagram of an embodiment of an enterprise network constructed according to the teachings of the present invention.

FIG. 1 is a block diagram of an embodiment of an enterprise network, indicated generally at 100, and constructed according to the teachings of the present invention. In enterprise network 100 users at geographically separate locations 150, 151, and 152 may be connected over wide area network 102, e.g., Frame Relay, ATM or other network capable of similar services. Enterprise network 100 also includes service delivery units 108, 109 and 170. Service delivery units 108, 109 and 170 control access to wide area network 102 for the users in locations 150, 151, and 152, respectively, in enterprise network 100. Service delivery units 108, 109, and 170 each provide the following functionality:

1. Demarcates the interface between local networks and wide area network 102; and
2. Monitors of enterprise network 100 at the physical and link layers.

In addition to these functions, service delivery units 108, 109, and 170 also provide a bandwidth management function for enterprise network 100. The bandwidth management function consists of at least three components:

1. Protocol and application level queuing and flow control,
2. Mapping of application and/or user specific traffic to appropriate service delivery media and methods based on delivery characteristics (such as CIR, delay and latency), and
3. Packet/traffic labeling for getting service priority within service provider network.

This bandwidth management function is managed through policies for enterprise network 100 stored in policy server 110. Advantageously, by managing access to bandwidth in wide area network 102 at service delivery units 108, 109 and 170 based on global policies, enterprise network 100 is able to assure that sufficient bandwidth in wide area network 102 can be allocated to users when high priority mission critical requests are received.

Enterprise network 100 includes a number of local area networks that are located in geographically different locations. In the embodiment of FIG. 1, enterprise network 100 includes local area networks in three different locations 150, 151, and 152. However, it is understood that enterprise network 100 can include any appropriate number of locations to meet the communications needs of the enterprise. Location 150 includes local area networks 104-1, . . . , 104-N, location 151 includes local area networks 173-1, . . . , 173-K, and location 152 includes local area networks 106-1, . . . , 106-M.

Enterprise network 100 includes at least one permanent virtual connection through wide area network 102 between each one of the locations 150, 151 and 152. These connections are identified as connections A, B, and C. For example, connection A couples router 114 in location 150 through service delivery unit 108 with router 171 in location 151 through service delivery unit 170. Similarly, connection B couples router 114 in location 150 through service delivery unit 108 with router 118 in location 152 through service delivery unit 109. Finally, connection C couples router 171 in location 151 through service delivery unit 170 with router 118 in location 152 through service delivery unit 109.

At each location 150, 151, and 152, the local area networks are coupled to the router through a concentrator, hub, switch, or other piece of equipment that allows a number of local area networks to be connected to a service delivery unit. For example, local area networks 104-1, . . . , 104-N are coupled to at least one data port of service delivery unit 108 by router 114 and hub or switch 112. Similarly, local area networks 106-1, . . . , 106-M are coupled to at least one data port of service delivery unit 109 by router 118 and hub or switch 116. Finally, local area networks 173-1, . . . , 173-K are coupled to at least one data port of service delivery unit 170 by router 171 and hub or switch 172.

It is noted that routers 114, 116 and 172 are optional in that the functionality of routers 114, 116, and 172 can be incorporated into service delivery units 108, 109 and 170, respectively. Service delivery units 108, 109, and 170 are coupled to wide area network 102 through a network interface port over, for example, one or more permanent virtual connections implemented on T1, E1 or other appropriate communication links.

Policy server 110 stores a number of global policies in electronic format on, e.g., a server, disc or other computer readable medium. Policy server 110 is coupled to service delivery units 108, 109 and 110 through a logical policy server port. Physically, the connection may be accomplished over the network interface port, an Ethernet port or other appropriate physical interface of service delivery units 108, 109, and 170. The policies provide rules for allowing access to bandwidth in wide area network 102 for users on local area networks 104-1, . . . , 104-N and 106-1, . . . 106-N. For example, the policies may include relative priority of different kinds of uses for the bandwidth. This could include ranking of different uses and even blocking out some uses of the bandwidth. For example, Internet access may be set at a low-level priority with particular web sites completely blocked out. Other policies may establish higher priority for mission critical functions such as access to selected corporate databases. Further, the policies can also provide the type or amount of bandwidth that can be allocated to particular types of requests. Other appropriate policies can be stored on policy server 110 to provide rules for allocating the bandwidth in wide area network 102 to users of the enterprise network so as to reduce the likelihood that congestion in wide area network 102 will slow down or reduce the speed of mission critical applications.

In the embodiment shown in FIG. 1, each connection between service units 108, 109, and 170 is shown as three connections. Each of the connections between two service units may provide different quality and/or quantity of bandwidth, e.g., low, medium and high quality. Service units 108, 109 and 170 can route data onto the connections based on global policies as discussed above. The use of multiple connections advantageously allows the use of "service mapping" in enterprise network 100. Service mapping is a technique for matching WAN usage against available quality and quantity of WAN links. In case of multiple WAN links between two sites that have different SLAs. Service delivery units 108, 109, and 170 dynamically determine the type of traffic, match the traffic with an appropriate WAN link (based on appropriate SLA) per defined policies and then allocate bandwidth on that WAN link. For example, service delivery unit 108 may match mission critical SAP traffic on a high quality WAN link and place non-mission critical electronic mail traffic on low quality WAN link. This technique also allows abstraction of WAN connection type from the traffic classification and bandwidth control components of the service delivery unit. This approach allows service delivery units to support multiple WAN type interfaces without impacting traffic classification and control functionality of the product.

In the embodiment shown in FIG. 1, a single policy server is provided for enterprise network 100. Service delivery units 108, 109 and 170 are coupled to policy server 110. The connections between policy server 110 and service delivery units 108, 109 and 170 can be accomplished in a number of ways. For example, service delivery units 108, 109 and 170 can communicate with policy server 110 locally or over a secure connection in wide area network 102. Alternatively, other conventional communication links can be established between policy server 110 and service delivery units 108, 109 and 170. In other embodiments, more than one policy server can be used to provide backup. Policy server 110 can be co-located at a site of one of the service delivery units 108, 109, or 170. Alternatively, policy server 110 can be located at another location independent of the location of the service delivery units 108, 109, and 170 so long as accessibility is maintained for the service delivery units 108, 109, and 170.

Service delivery units 108, 109, and 170 include local decision points (LDPs) 122, 121, and 123, respectively. Local decision points 122, 121, and 123 communicate with policy server 110, as needed, and cache policies from policy server 110. Local decision points 122, 121, and 123 use the cached policies to determine bandwidth allocation when possible. If a policy is not found in the cache, local decision points 122, 121, and 123 obtain the needed policy from policy server 110.

In operation, enterprise network 100 uses bandwidth management based on global policies to improve the allocation of bandwidth in wide area network 102. The operation of the bandwidth allocation function of enterprise network 100 is described in terms of a request from a user of LAN 104-1. Initially, the user on LAN 104-1 requests bandwidth in wide area network 102 to use service available at location 150. The request is received at the data port of service delivery unit 108. Service delivery unit 108 classifies the request, e.g., identifies the user by IP address, identifies the type of service requested. Next, service delivery unit 108 retrieves the policies necessary to process the request. These global policies may be retrieved from local decision point 122 if previously cached, or may be obtained directly from policy server 110.

Based on the retrieved policies, service delivery unit 108 takes action to allocate bandwidth to the user. In one embodiment, the policies implemented by service delivery unit 108 control the allocation of bandwidth based on the priority of the request and the availability and type of bandwidth needed. To accomplish this, service delivery unit 108 determines the amount and type of bandwidth requested, the priority for the request, whether sufficient bandwidth is available, and when sufficient bandwidth is available, selectively assigns bandwidth to the user based on the policies.

II. Service Delivery Unit

Figure 2:
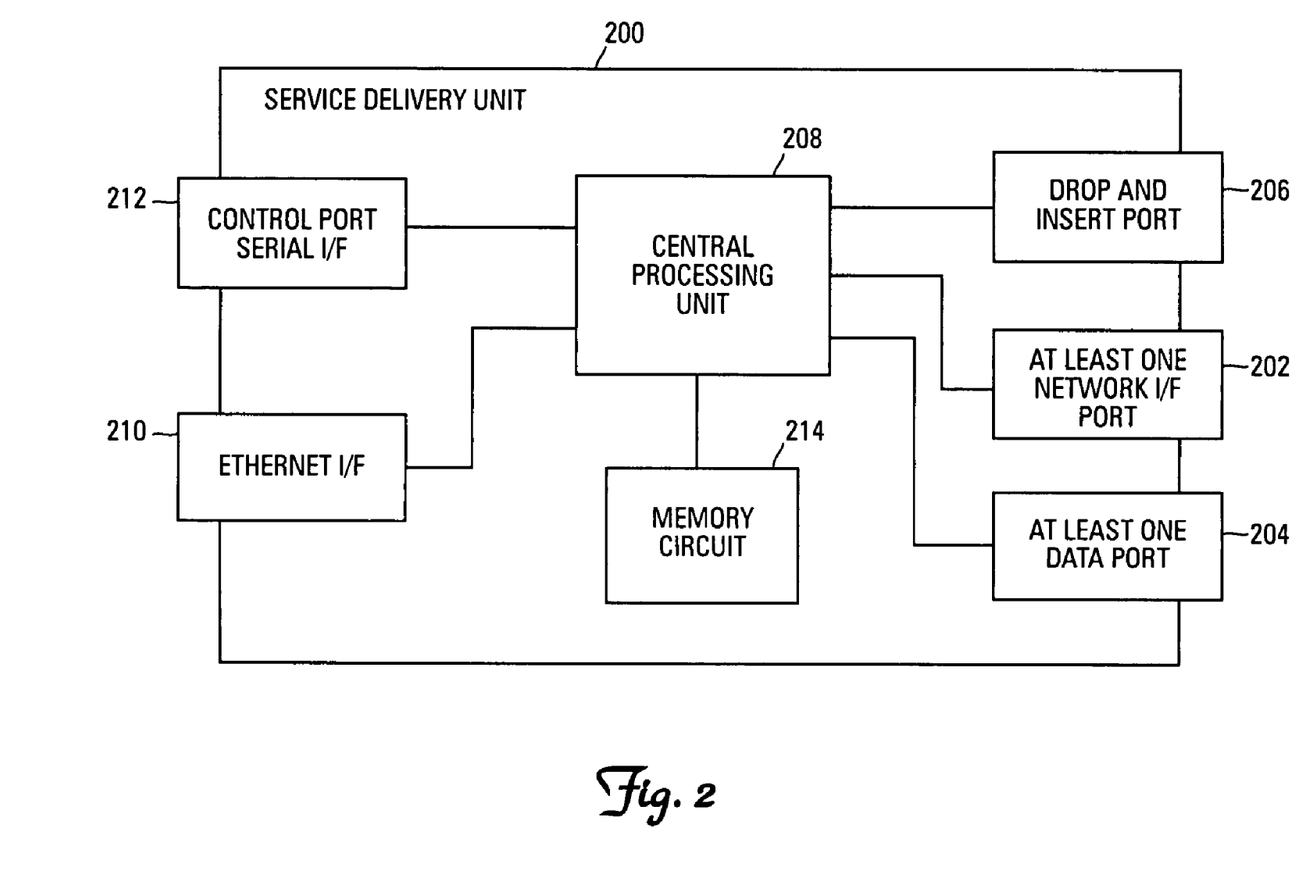
FIG. 2 is a block diagram of an embodiment of a service delivery unit constructed according to the teachings of the present invention.

FIG. 2 is a block diagram of an embodiment of a service delivery unit, indicated generally at 200, and constructed according to the teachings of the present invention. Service delivery unit 200 provides functionality of a point of demarcation between the local networks and the wide area network. Advantageously, service delivery unit 200 also provides bandwidth management for the wide area network (WAN) side of the enterprise network. This bandwidth management function utilizes global policies stored in a policy server to control the allocation of bandwidth in the wide area network so that the valuable WAN bandwidth resources are used effectively.

Service delivery unit 200 includes central processing unit 208 that executes instructions to perform global policy based bandwidth management for access to the wide area network of the enterprise network. Central processing unit 208 receives inputs from a number of different ports in providing this bandwidth management function. Each of these ports is discussed in turn.

Service delivery unit 200 includes at least one network interface port 202. Network interface port 202 provides a connection point for the wide area network. Typically, network interface port 202 is coupled to the wide area network over, e.g., a T1, or E1 line. Network interface port 202 thus provides a port to communicate data with the wide area network. It is the bandwidth available through this port 202 that is controlled by the policy based bandwidth management of service delivery unit 200.

Service delivery unit 200 further includes at least one data port 204. Data port 204 provides a connection point for a number of local area networks to communicate with the wide area network through service delivery unit 200. Data port 204 typically handles data over a V.35 physical interface although other physical interfaces can also be used. Requests for access to the wide area network are also received through data port 204.

Service delivery unit 200 further may include drop and insert port 206. Drop and insert port 206 is similar to network interface port 206 in terms of physical interface. Drop and insert port 206 allows unused (provisioned for voice or video) part of the WAN link to be given to other enterprise applications, such as PBX or video conferencing equipment.

Service delivery unit also includes Ethernet port 210 and a control port serial interface 212. These ports can be used for management and control of service delivery unit 200. Ethernet port 210, in other embodiments, can use any appropriate protocol for local network access such as, Token Ring, Gigabit Ethernet.

Service delivery unit 200 also includes a logical "policy server interface port." This logical interface port for the policy server can be implemented on network interface port 202, Ethernet port 210, or data port 204. The logical interface port provides a connection point for a policy server. The policy server provides data regarding policies for bandwidth allocation to service delivery unit 200. Central processing unit 208 caches the policy results received at port 206 such that policy results are retrieved from the server only when the necessary policy results are not in the cache for a particular request.

Data is stored in service delivery unit 200 in memory circuits 214. Memory circuits 214 may comprise, for example, a combination of persistent and non-persistent memory such as a mixture of dynamic random access memory and flash memory. Memory circuits 214 store the operating instructions for central processing unit 208 and thus store the program code used to control bandwidth allocation by service delivery unit 200.

The operation of service delivery unit 200 is described by reference to FIGS. 3 and 4 below.

Figure 3:
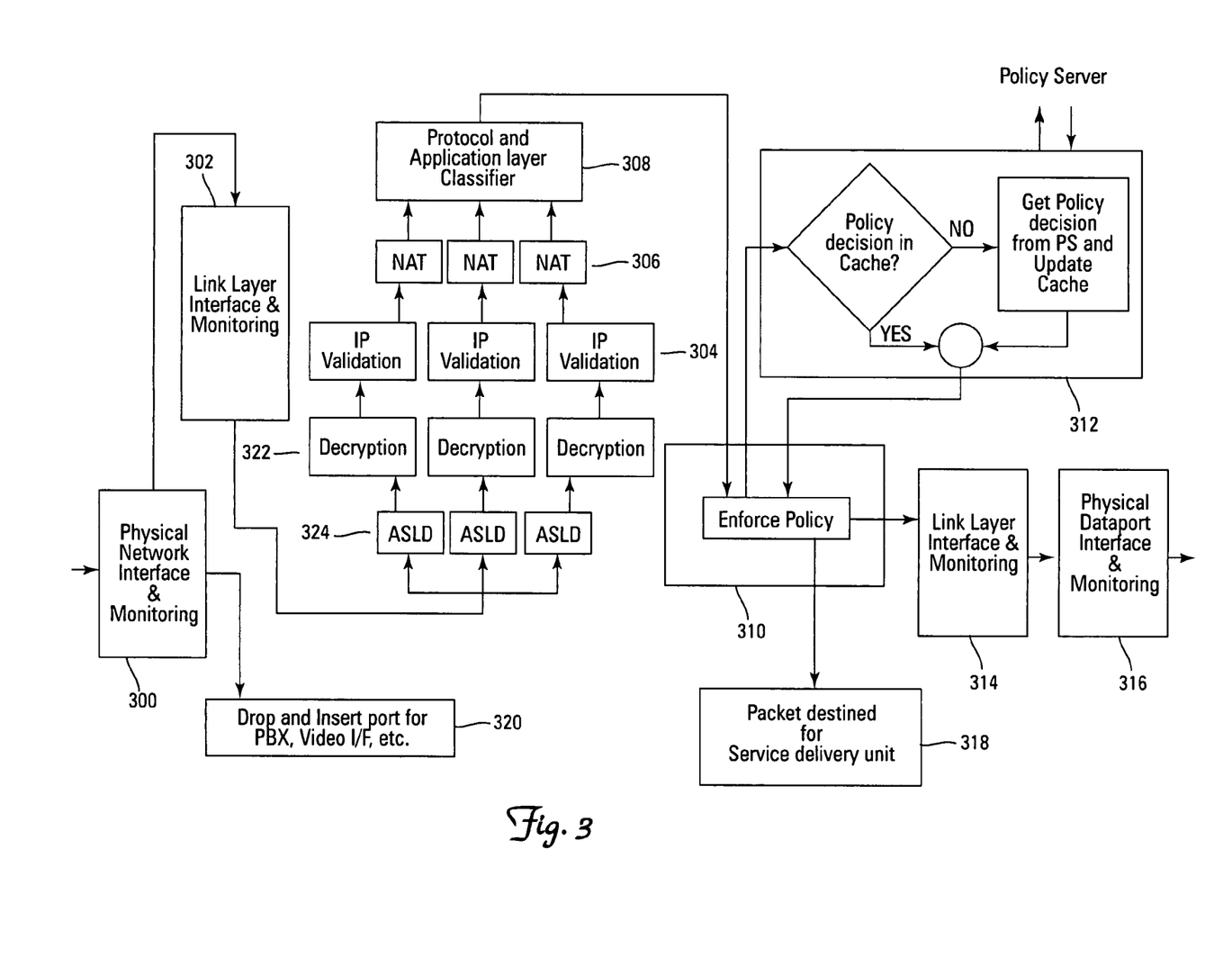
FIG. 3 is a flow chart that illustrates an embodiment of a process for processing packets in a service delivery unit according to the teachings of the present invention.

FIG. 3 is a flow chart that illustrates an embodiment of a process for communicating data from a wide area network to a local area network through a service delivery unit according to the teachings of the present invention. At block 300, the method receives data from network interface port 202 and performs physical layer termination and monitoring functions. Block 300 also supports drop and insert functionality. This includes separating the data meant for the enterprise data network, the enterprise voice network and other applications such as Video Conferencing. Data meant for the enterprise data network is sent to block 302 while data meant for voice and video applications are sent to the appropriate physical ports at block 320.

Service delivery unit 200 performs link layer interface and monitoring functions at block 302. For example, for Frame Relay service, the service delivery unit 200 may perform all features aimed at supporting Frame Relay interface and validating SLA parameters. The SLA validation function may include non-intrusive and intrusive monitoring that is necessary to validate layer 2 service.

In block 324, data from multiple link layer connections, such as PVC for Frame Relay, is sent to the appropriate Abstract Service Layer Devices (ASLD). The ASLD allows the higher protocol and application layers to be independent of the lower (physical and link) layers. This architectural feature allows multiple physical network interfaces supporting different service delivery methods (e.g., Frame Relay, ATM, PPP) to be supported on the same service delivery unit simultaneously without changing higher layer support. For each ASLD block 324, there are corresponding 322, 304, and 306 blocks.

Service delivery unit 200 optionally decrypts data packets at block 322. For example, for running mission critical data over non-secure connections, such as Public IP, encryption and tunneling supported by IPSec protocol may be used to ensure data security. This function may be done in either software or using a hardware module.

Service delivery unit 200 further validates data packets at block 304. For example, service delivery unit 200 validates the type and version of the IP protocol, the checksum, length and basic format of the packet. It is understood that service delivery unit 200 can perform other validation as necessary for the policies used for bandwidth management.

In this case, the packets are being transmitted over the wide area network to a recipient on a local area network. The local IP address for the intended recipient may be different from the public IP address of the received packet. Thus, at block 306, service delivery unit 200 translates the public IP address/port to an internal IP address/port for the packet, if necessary. This is referred to as network address translation (NAT).

At block 308, service delivery unit 200 evaluates the packet to determine type of protocol, source and destination users, type of application, and any other information necessary to ascertain the internal state (part of a normal state transition) of the active application. This information is used for real-time and historical reporting along with policy lookup. Service delivery unit 200 may use appropriate industry standard (remote monitoring (RMON) and RMON II) and custom methods for reporting data gathered in block 308.

At block 310, service delivery unit 200 performs policy enforcement for the packets received at network interface port 202. Based on the users and application data gathered in block 308, service delivery unit 200 determines if this is a new session (conversation) or an existing session. For all new sessions (policy decision is =not checked for an existing session), block 310 asks the local decision point (LDP), block 312, for matching policy results. Due to the dynamic nature of today's enterprise, the network usage is constantly changing and results of a policy will in fact change based on time of the day, day of the week, health of the network and other network users. Block 310 receives the policy results from LDP block 312 and performs the queuing or flow control as appropriate for the protocol and passes the data to the appropriate next processing block. Block 310 has the functionality for monitoring the bandwidth allocated to the user and the type of use, e.g., Internet page, intranet page, e-mail, voice, video conference, or the like, to assure that the allocated bandwidth is not exceeded. If the packet is destined for the service delivery unit 200, the packet is sent to block 318. If the packet is destined for other devices in the enterprise network, then the packet is sent to block 314 for further processing.

The local policy decision (LDP) functionality is in block 312. On request from block 310, LDP block 312 examines the local policy decision cache for a matching entry. In case the decision is not in the cache, block 312 communicates with the policy server to get the appropriate decision. The policy decision is then sent to the Policy Enforcement Point (PEP), block 310, and the local cache is updated for all future references.

The data port link layer management is handled by block 314 and the physical layer port management is handled by block 316. Blocks 314 and 316 provide similar functionality as provided by blocks 300 and 302.

At block 318, packets destined for the service delivery unit 200 are processed. They are expected to include various device management functions, device-policy server synchronization functions and authentication token synchronization services.

Figure 4:
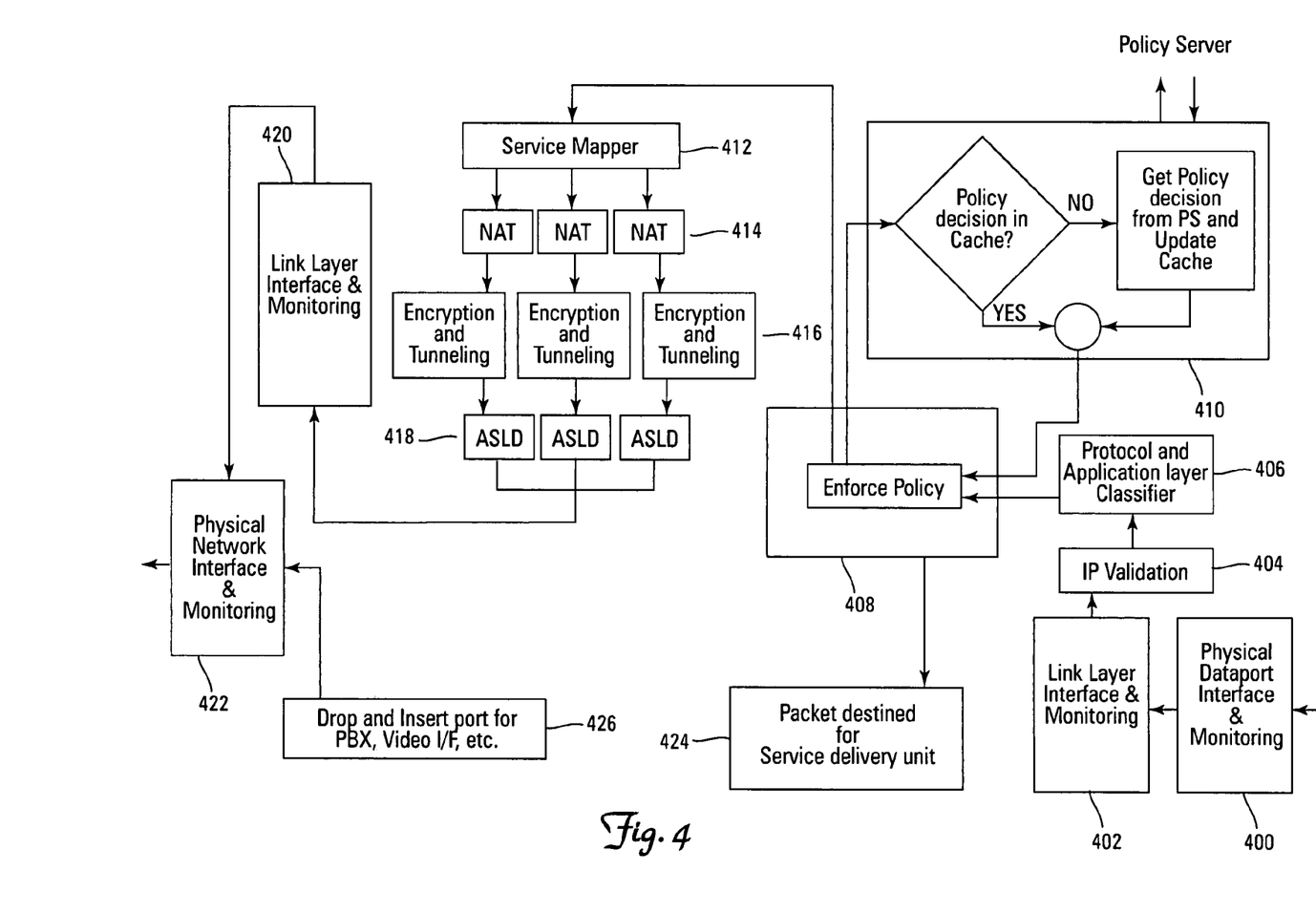
FIG. 4 is a flow chart that illustrates an embodiment of a process for processing packets in a service delivery unit according to the teachings of the present invention.

FIG. 4 is a flow chart that illustrates an embodiment of a process for communicating data from the local area network to a wide area network through a service delivery unit according to the teachings of the present invention. At block 400, the method receives data from data port 204. Service delivery unit 200 performs a monitoring function at block 402. For example, service delivery unit 200 uses Frame Vision to perform Frame Relay functionality to process the data received from the local area network and to perform layer 2 monitoring of the same data.

Service delivery unit 200 further validates data packets at block 404. For example, service delivery unit 200 validates the type and version of the IP protocol, the checksum, length and basic format of the packet. It is understood that service delivery unit 200 can perform other validation as necessary for the policies used for bandwidth management.

At block 406, service delivery unit 200 evaluates the packet to determine type of protocol, source and destination users, type of application, and any other information necessary to ascertain the internal state (part of a normal state transition) of the active application. This information is used for real-time and historical reporting along with policy lookup. Service delivery unit will use appropriate industry standard (RMON and RMON II) and custom methods for reporting data gathered in block 406.

At block 408, service delivery unit 200 performs policy enforcement for the packets received at data port 204. Based on the users and application data gathered in block 406, service delivery unit 200 determines if this is a new session (conversation) or an existing session. For all new sessions (policy decision is not checked for an existing session), block 408 asks the LDP, block 410, for matching policy results. Due to the dynamic nature of today's enterprise, the network usage is constantly changing and results of a policy may in fact change based on time of the day, day of the week, health of the network and other network users. Block 408 receives the policy results from LDP block 410 and performs the bandwidth enforcement function. This includes end-to-end application queuing or flow control as appropriate for the protocol as well as re-mapping the packet header to get appropriate priority within the service provider's network. For example, the re-mapping may include the Type of Service (TOS) field in packet header. The data is then sent to the appropriate next processing block. Block 408 has the functionality for monitoring the bandwidth allocated to the user and the type of use, e.g., Internet page, intranet page, e-mail, voice, video conference, or the like, to assure that the allocated bandwidth is not exceeded. If the packet is destined for the service delivery unit, the packet is sent to block 424. If the packet is destined for other devices in the enterprise network, then the packet is sent to block 412 for further processing.

At block 412, service delivery unit 200 performs service mapping function for the packets received at data port 202. The service mapping function provides an alternative to running all enterprise applications over a single high bandwidth expensive connection between two enterprise sites by replacing them with multiple less expensive connections. The service mapping function allows service delivery unit 200 to optimize data delivery between enterprise locations by matching applications and users with connections with appropriate SLAs. An example may include three connections between two enterprise locations.

1. Connection A has a premium SLA (this may include CIR=256 KBPS, latency=5 microseconds and delay=5 microseconds),
2. Connection B has a medium SLA (this may include CIR=64 KBPS, latency=15 microseconds and delay=15 microseconds),
3. Connection C has a low SLA (this may include CIR=0 KBPS, latency=50 microseconds and delay=100 microseconds), In this example, service mapping block 412 utilizes the classification data from block 406 to send, for example, mission critical SAP traffic on Connection A, Intranet Web traffic on Connection B and electronic mail and Internet Web browsing on Connection C.

The use of service mapping approach avoids Internet and Intranet Web traffic from impacting mission critical SAP traffic.

In this case, the packets are being transmitted over the wide area network to a recipient on a local area network. The local IP address for the intended recipient may be different from the public IP address of the received packet. Thus, at block 414, service delivery unit 200 translates the intended IP to public IP address/port for the packet, if necessary.

Service delivery unit 200 optionally encrypts data packets at block 416. For example, for running mission critical data over non-secure connections, such as Public IP, encryption and tunneling supported by IPSec protocol may be used to ensure data security. This function may be done in either software or using a hardware module.

In block 418, data from multiple link layer connections, such as PVC for Frame Relay, is sent to the appropriate Abstract Service Layer Devices (ASLD). The ASLD allows the higher protocol and application layers to be independent of the lower (physical and link) layers. This architectural feature allows multiple physical network interfaces supporting different service delivery methods (Frame Relay, ATM, PPP, etc.) to be supported on the same service delivery unit simultaneously without changing higher layer support.

Service delivery unit 200 performs link layer interface and monitoring function at block 420. For example, for Frame Relay service, the service delivery unit 200 would perform all features aimed at supporting Frame Relay interface and validating SLA parameters. The SLA validation function would include non-intrusive and intrusive monitoring that is necessary to validate layer 2 service.

At block 422, the method transmits data to network interface port 202 and performs physical layer termination and monitoring function. The block also supports drop and insert functionality. This includes separating the data meant for the enterprise data network, the enterprise voice network and other applications such as Video Conferencing. Data meant for the enterprise data network is sent to block 426 while data meant for voice and video applications are sent to the appropriate physical ports.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. The service delivery unit described provides bandwidth management in a wide area network portion of an enterprise network based on global policies. The actual policies implemented in a particular application can be adjusted to meet the needs of the enterprise network. The policies can consider factors other than the use of the bandwidth and the priority of the use or the user. Further, the functionality of the router in FIG. 1 can be incorporated into the service delivery unit. Further, the service delivery unit can also include functionality for providing a firewall.

What is claimed is:

1. An enterprise network comprising:
   a plurality of local area networks;
   at least one service delivery unit having a data port and a network interface port;
   the network interface port coupled to a wide area network;
   the data port coupled to the plurality of local area networks; and
   a policy server, communicatively coupled to the at least one service delivery unit, the policy server including policies for bandwidth allocation stored on a computer readable medium, such that the service delivery unit selectively allocates bandwidth to users based on the policies stored in the policy server
   wherein the at least one service delivery unit classifies network requests and identifies the policies that relate to the request.

2. The enterprise network of claim 1, and further including a router coupled between the data port and the plurality of local area networks.

3. The enterprise network of claim 1, wherein the data port is coupled to the local area network over an Ethernet connection.

4. The enterprise network of claim 1, wherein the at least one service delivery unit includes a cache that stores policies retrieved from the policy server.

5. The enterprise network of claim 1, wherein the policy server includes at least two servers that are located at geographically different locations in the enterprise network.

6. The enterprise network of claim 5, wherein service delivery units that are located at geographically different locations from the at least two servers communicate with one of the at least two servers over a permanent virtual connection in the wide area network.

7. The enterprise network of claim 6, and wherein the permanent virtual connection comprises a secure connection.

8. The enterprise network of claim 1, wherein the at least one service delivery unit includes router functionality.

9. The enterprise network of claim 1, wherein the policies stored on the policy server include data that the at least one service delivery unit uses to prioritize access to bandwidth over the wide area network and to control the amount of bandwidth allocated for each request.

10. The enterprise network of claim 1, wherein the at least one service delivery unit uses service mapping in allocating bandwidth to a user based on the policies stored on the policy console.

11. A service delivery unit, comprising:
a network interface port coupleable to a wide area network;
a data port coupleable to a plurality of local area networks;
a policy server interface coupleable to a policy server that includes policies for bandwidth allocation stored on a computer readable medium; and
a central processing unit, communicatively coupled to the network interface port, the data port and the policy server interface, wherein the central processing unit executes instructions to selectively allocate bandwidth in the wide area network for users of the plurality of local area networks based on the policies stored in the policy server;
wherein the central processing unit classifies network requests and identifies the policies that relate to the request.

12. The service delivery unit of claim 11, wherein the central processing further executes instructions to perform router functions for the data port.

13. The service delivery unit of claim 11, and further comprising a cache for caching policies retrieved from the policy server.

14. The service delivery unit of claim 11, wherein the network interface port comprises an interface that is coupleable to the wide area network to provide communication over a number of permanent virtual connections.

15. The service delivery unit of claim 11, wherein the central processing unit uses service mapping to allocate bandwidth.

16. An enterprise network comprising:
at least one local area network at a first geographic location;
at least one additional local area network at a second, different geographic location;
a first service delivery unit having a data port that is coupled to the at least one local area network and a network interface port that is coupled to a wide area network;
a second service delivery unit having a data port that is coupled to the at least one additional local area network and a network interface port that is coupled to the wide area network; and
a policy server, communicatively coupled to the first and second service delivery units, the policy server including policies for bandwidth allocation stored on a computer readable medium, such that the service delivery units selectively allocate bandwidth to users based on the policies stored in the policy server,
wherein the first and second service delivery units classify network requests and identify the policies that relate to the request.

17. A method for providing bandwidth management in an enterprise network, the method comprising:
receiving a request for connection over a wide area network;
classifying the request;
identifying global policies that relate to the request; and
applying the identified policies to control the priority and amount of bandwidth to allocate to the request over the wide area network.

18. The method of claim 17, wherein classifying the request comprises:
identifying the user by IP address; and
identifying the type of request.

19. The method of claim 17, wherein identifying policies comprises:
identifying policies in a cache of a service delivery unit; and
when applicable policies are not found in the cache, requesting additional policies from a policy server.

20. The method of claim 19, wherein requesting additional policies from the policy server comprises communicating with the policy server over a secure permanent virtual connections.

21. The method of claim 17, wherein applying the identified policies comprises:
determining the amount and type of bandwidth requested;
determining the priority for the request;
determining whether sufficient bandwidth is available; and
when sufficient bandwidth is available, selectively assigning bandwidth to the user based on the policies.

* * * * *